(12) United States Patent
Bich et al.

(10) Patent No.: US 8,151,547 B2
(45) Date of Patent: Apr. 10, 2012

(54) BLADE ASSEMBLY REMOVAL FROM A HEADER OF A PLANT CUTTING MACHINE

(75) Inventors: Gary Bich, New Holland, PA (US); Beau A. Carlson, Bettendorf, IA (US); Luke A. Schroeder, Leola, PA (US)

(73) Assignee: CNH America LLC, New Holland, PA (US)

(*) Notice: Subject to any disclaimer, the term of this patent is extended or adjusted under 35 U.S.C. 154(b) by 221 days.

(21) Appl. No.: 12/572,665

(22) Filed: Oct. 2, 2009

(65) Prior Publication Data

US 2011/0078989 A1   Apr. 7, 2011

(51) Int. Cl.
*A01D 43/00*   (2006.01)
(52) U.S. Cl. .......................... 56/158; 56/296
(58) Field of Classification Search .............. 56/296, 56/297, 298, 158, 181, 304
See application file for complete search history.

(56) References Cited

U.S. PATENT DOCUMENTS

| | | |
|---|---|---|
| 229,417 A | 6/1880 | James |
| 366,742 A | 7/1887 | Shull |
| 402,159 A | 4/1889 | Hank |
| 540,623 A | 6/1895 | Ball et al. |
| 668,486 A | 2/1901 | Brown |
| 954,009 A | 4/1910 | Wilson |
| 974,707 A | 11/1910 | Poole et al. |
| 1,049,675 A | 1/1913 | Conner |
| 1,218,511 A | 3/1917 | Berglund |
| 1,231,111 A | 6/1917 | Alford |
| 2,742,753 A | 4/1956 | Hardman |
| 3,896,610 A | 7/1975 | Hiniker |
| 4,021,999 A * | 5/1977 | Case .............................. 56/298 |
| 4,805,390 A * | 2/1989 | Majkrzak ....................... 56/300 |
| 5,024,051 A * | 6/1991 | Glass et al. .................... 56/297 |
| 5,040,363 A * | 8/1991 | Limburg et al. ................ 56/300 |
| 5,161,357 A * | 11/1992 | Braunberger et al. ............. 56/3 |
| 6,708,476 B1 * | 3/2004 | Blakeslee et al. .............. 56/296 |
| 6,886,316 B2 * | 5/2005 | Schumacher ................... 56/296 |
| 7,313,903 B2 * | 1/2008 | Schumacher et al. .......... 56/304 |
| 7,861,505 B1 * | 1/2011 | Figgins et al. ................. 56/296 |
| 2005/0028505 A1 * | 2/2005 | Schumacher ................... 56/296 |

* cited by examiner

*Primary Examiner* — Arpad Fabian-Kovacs
(74) *Attorney, Agent, or Firm* — Michael G. Harms

(57) ABSTRACT

A cutting assembly for a header of a plant-cutting machine includes a blade assembly fastened to a head assembly, which is configured to be drivingly connected to a motor. The cutting assembly is suitable for mounting proximate to the center of the header, in an end-to-end relation with another cutting assembly. Removal of the blade assembly from the head assembly can be efficiently effected by releasing or removing a small number of fasteners, thus allowing an operator to readily remove or replace the blade assembly as needed.

21 Claims, 13 Drawing Sheets

BLADE ASSEMBLY REMOVAL FROM A HEADER OF A PLANT CUTTING MACHINE

This invention relates generally to a cutting assembly for a header of a plant-cutting machine (e.g., combine, windpower) and, more specifically, to a cutting assembly that is suitable for mounting proximate to the center of the header.

BACKGROUND OF THE INVENTION

The cutting assemblies of the known large headers of plant-cutting machines (e.g., combine, windpower) are driven from the side or end of the header by an oscillating drive, which can include, but is not limited to, an eccentric shaft on a rotating hub, a wobble drive, or a similar well-known commercially-available device. A header configuration having an oscillating drive at the side or end of the header is advantageous in that the drive does not obstruct or interfere with the flow of cut plants (e.g., cut crops) into the header. Nevertheless, this header configuration is disadvantaged in that the weight of the oscillating drive is concentrated at the side or end of the header. More specifically, because this weight is distally concentrated, the structure of the header must be reinforced to properly accommodate this stress. Additionally, relatively long drive lines are generally required to establish a connection between the oscillating drive and the motor, which is usually mounted proximate the center of the header. Furthermore, relative to a center-mounted oscillating drive, a side- or end-mounted oscillating drive has a tendency to cause additional vibrations within the header during operation. Generally speaking, however, the cutting assemblies that are compatible with side- or end-mounted oscillating drives can be efficiently removed and, if necessary, replaced by an operator.

Accordingly, what is sought is a cutting assembly that is efficiently removable and is compatible with a drive mounted proximate the center of a header and that, when used in combination with such a drive, overcomes one or more of the disadvantages referenced above.

SUMMARY OF THE INVENTION

In accordance with one aspect of the present invention, a knife head assembly for a header of an agricultural cutting machine is disclosed. The knife head assembly includes an elongate head attach bar having a major axis and a series of cavities formed along a first surface. A portion of the first surface is configured to form a flush contact with a blade assembly. The elongate head attach bar further includes a series of first fastener-receiving through-openings parallel to the major axis, and each first fastener-receiving through-opening of the series passes through the first surface and a second surface. Additionally, the elongate head attach bar includes a second fastener-receiving through-opening, which passes through the first surface and a projection extending from the second surface. The knife head assembly further includes a bearing unit adjacent the projection. The bearing unit includes a bearing retainer and an annular bearing having an interior surface bordering a bearing through-opening. The annular bearing is retained in the bearing retainer, and the bearing through-opening is substantially coaxial to the second fastener-receiving through-opening. The knife head assembly further includes a connecting block having a connecting block through-opening. The connecting block is configured to retain the bearing unit in the connecting block through-opening, and the connecting block is configured to receive a driver element.

In accordance with another aspect of the present invention, a cutting assembly suitable for mounting proximate to the center of a header of a plant-cutting machine is disclosed. The cutting assembly includes a head assembly, a blade assembly, and a series of removable fasteners. The head assembly includes an elongate head attach bar having a major axis and a series of cavities formed along a first surface. A portion of the first surface is configured to form a flush contact with a blade assembly. The elongate head attach bar further includes a series of first fastener-receiving through-openings parallel to the major axis, and each first fastener-receiving through-opening of the series passes through the first surface and a second surface. Additionally, the elongate head attach bar includes a second fastener-receiving through-opening, which passes through the first surface and a projection extending from the second surface. The knife head assembly further includes a bearing unit adjacent the projection. The bearing unit includes a bearing retainer and an annular bearing having an interior surface bordering a bearing through-opening. The annular bearing is retained in the bearing retainer, and the bearing through-opening is substantially coaxial to the second fastener-receiving through-opening. The knife head assembly further includes a connecting block having a connecting block through-opening. The connecting block is configured to retain the bearing unit in the connecting block through-opening, and the connecting block is configured to receive a driver element. The blade assembly includes an elongate blade attach bar that includes a series of first apertures configured to receive the series of removable fasteners. The series of first apertures is substantially coaxial with the series of first fastener-receiving through-openings of the elongate head attach bar. The elongate blade attach bar further includes a series of second apertures configured to receive a series of blade fasteners therethrough. The series of second apertures is substantially aligned with the series of cavities of the elongate head attach bar. The series of removable fasteners secures the elongate blade attach bar to the elongate head attach bar, thereby securing the blade assembly to the head assembly. The series of removable fasteners passes through the series of first fastener-receiving through-openings of the elongate head attach bar and penetrates the series of first apertures of the elongate blade attach bar.

In accordance with still another aspect of the present invention, a header for a plant-cutting machine is disclosed. The header comprises a first cutting assembly, which is drivingly connected proximate the center of the header, and a second cutting assembly, which is drivingly connected proximate the center of the header, the second cutting assembly being in an end-to-end relation with the first cutting assembly and being substantially coaxial to the first cutting assembly. The second cutting assembly includes a head assembly, which includes an elongate head attach bar having a major axis and a series of cavities formed along a first surface. A portion of the first surface is configured to form a flush contact with a blade assembly. The elongate head attach bar further includes a series of first fastener-receiving through-openings parallel to the major axis, and each first fastener-receiving through-opening of the series passes through the first surface and a second surface. Additionally, the elongate head attach bar includes a second fastener-receiving through-opening, which passes through the first surface and a projection extending from the second surface. The knife head assembly further includes a bearing unit adjacent the projection. The bearing unit includes a bearing retainer and an annular bearing having an interior surface bordering a bearing through-opening. The annular bearing is retained in the bearing retainer, and the bearing through-opening is substantially coaxial to the second fastener-receiving through-opening. The head assembly further includes a connecting block having a connecting block through-opening. The connecting block is configured to retain the bearing unit in the connecting block through-opening, and the connecting block is configured to receive a driver element.

An advantage of the cutting assembly disclosed herein is that removal of the blade assembly from the head assembly can be efficiently effected by releasing or removing a small number of fasteners, thus allowing an operator to readily remove or replace the blade assembly as needed.

Another advantage of the cutting assembly disclosed herein is that it is compatible with a drive mounted proximate the center of a header.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
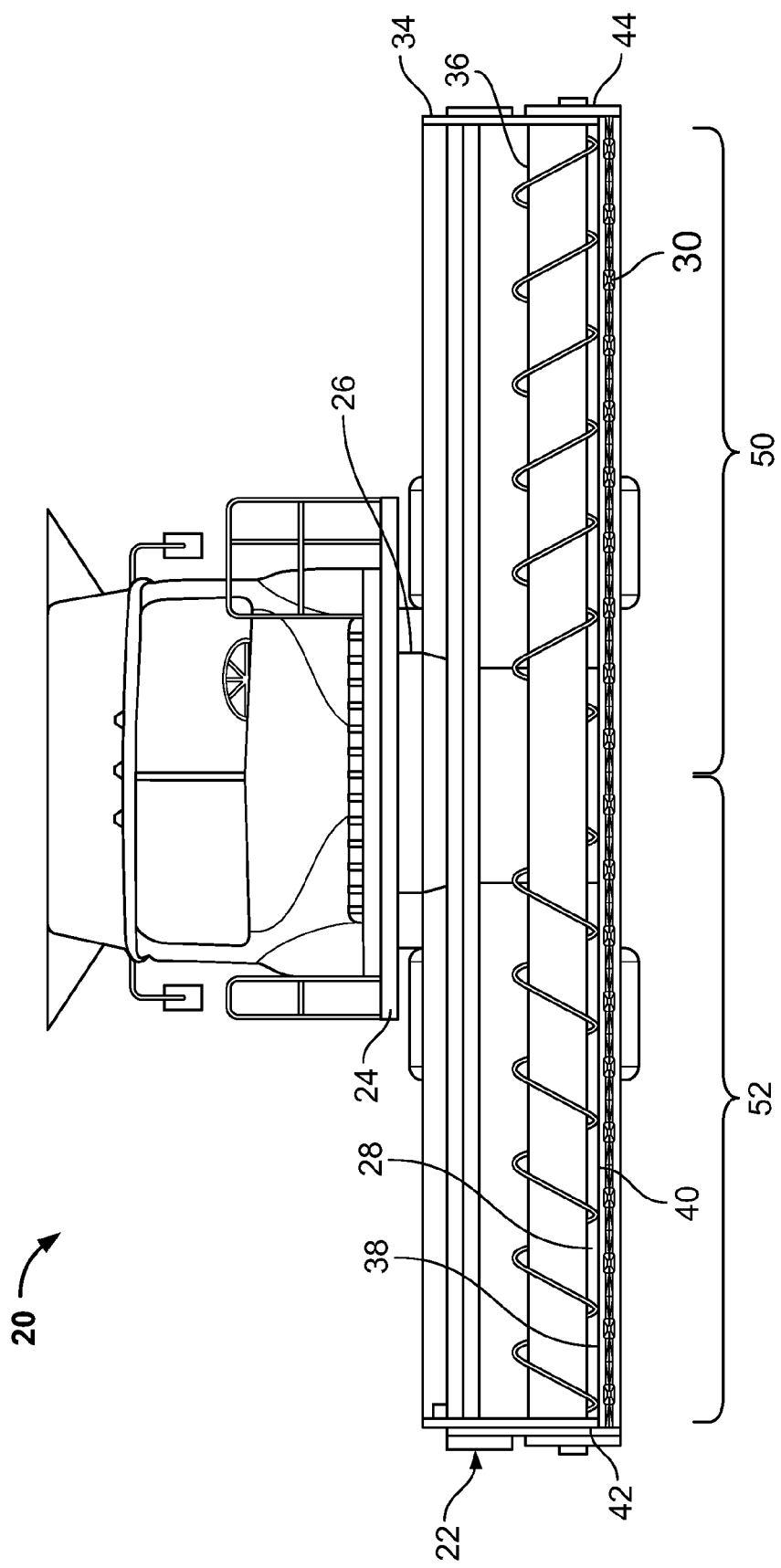
FIG. 1. is a schematic front view of a combine.

A combine 20, which is a well-known agricultural cutting machine, is shown in FIG. 1. Combine 20 includes a header 22, which is configured to cut or sever crops, including (without limitation) small grains (e.g., wheat, soybeans), and to induct the cut or severed crops into a feeder 26. Both functions can be performed as combine 20 moves forward over a crop field.

Header 22 is attached to a forward end 24 of combine 20 and includes a pan or floor 28 that is supported in desired proximity to the surface of a crop field. Header 22 includes an elongate sidewardly extending sickle 30 along a forward edge portion 32 (see FIG. 2) of floor 28. Sickle 30 is configured to cut or sever crops, in preparation for induction into a feeder 26. Additionally, header 22 includes an elongate, sidewardly extending reel 34 disposed above sickle 30. Reel 34 is rotatable in a direction suitable for facilitating the induction of cut or severed crops into feeder 26. Header 22 further includes an elongate, rotatable auger 36, which extends in close proximity to a top surface 38 of floor 28 and has helical flights therearound. Auger 36 is configured to cooperate with reel 34 in conveying cut or severed crops to feeder 26, which is configured to convey the cut or severed crops into combine 20 for threshing and cleaning. Alternatively, instead of rotatable auger 36, header 22 may include a draper head or other crop harvesting/gathering header.

Sickle 30 extends along a forward edge 40 of floor 28, and generally is bounded by a first side edge 42 and an opposing second side edge 44, both of floor 28. Sickle 30 includes a first cutting assembly 50 and a second cutting assembly 52. Referring FIG. 2, stationary guards 54 project forward from a stationary bar 58 and provide protection and stability for both first and second cutting assemblies 50, 52. Each stationary guard 54 is attached to a stationary bar 58 by a fastener 60. The stationary guards 54, which are spaced equally along stationary bar 58, define slots 62 that guide crops toward sickle 30 for cutting or severing as combine 20 moves forward over a crop field. During operation, sickle 30 reciprocates rapidly to effect a cutting or severing action that cuts or severs plant stems, stalks or other material present between blades 64. As denoted by arrow 66, blades 64 can reciprocate sideways. Stated another way, blades 64 can reciprocate on a plane that is generally perpendicular to the forward motion of combine 20 and approximately parallel to the surface of the crop field.

Figure 2:
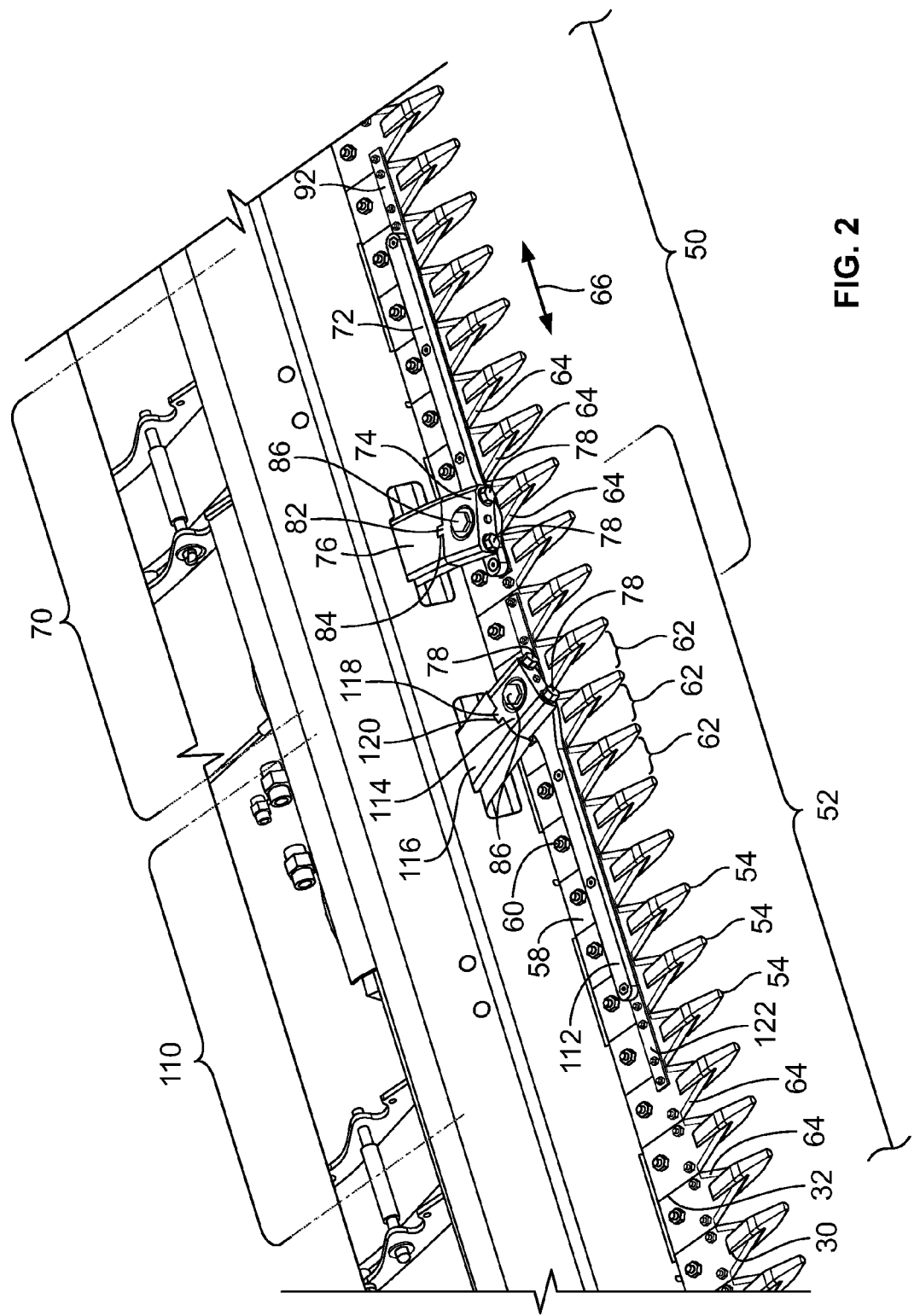
FIG. 2. is a partial view, in perspective, of a header having installed therein exemplary embodiments of the cutting assemblies of the present invention.

As shown in FIG. 2, first cutting assembly 50 includes a first head assembly 70, which, in turn, includes a first head attach bar 72 and a first connecting block 74. A first driver element 76 drivingly connects first cutting assembly 50 to a motor (not shown), which can provide the mechanical energy necessary to reciprocate a first plurality of blades corresponding to first cutting assembly 50 (see FIG. 3A at 94). More specifically, first driver element 76 is fastened to first connecting block 74 of first head assembly 70. In the exemplary embodiment shown in FIG. 2, two bolts 78 fasten first connecting block 74 to first head attach bar 72, although a person of ordinary skill in the relevant art will recognize other known fastening devices may be substituted. First connecting block 74 includes a protrusion 82, and first driver element 76 includes a complementary slot 84 configured to receive protrusion 82 therein. The engagement of protrusion 82 and complementary slot 84 aids in stabilizing the connection between first connecting block 74 and first driver element 76. A relatively large bolt 86 fastens together two major components of first head assembly 70, specifically, first head attach bar 72 and first connecting block 74. First head assembly 70 will be discussed in further detail. In addition to first head assembly 70, first cutting assembly 50 includes a first blade assembly 90 (see FIG. 3A), which, in turn, includes a first blade attach bar 92, a first plurality of blades 94 (see FIG. 3A), and first blade support bar 98 (see FIG. 3A).

Second cutting assembly 52, which is shown in FIG. 2, includes a second head assembly 110, which, in turn, includes a second head attach bar 112 and a second connecting block 114. A second driver element 116 drivingly connects second cutting assembly 52 to a motor (not shown), which provides the mechanical energy necessary to reciprocate a second plurality of blades corresponding to second cutting assembly 52. Second driver element 116 is fastened to second connecting block 114 of second head assembly 110. In the exemplary embodiment shown in FIG. 2, two bolts 78 fasten second connecting block 114 to second head attach bar 112, although a person of ordinary skill in the relevant art will recognize other known fastening devices may be substituted. Second connecting block 114 includes a protrusion 118, and second driver element 116 includes a complementary slot 120 configured to receive protrusion 118 therein. As in first cutting assembly 50, the engagement of protrusion 118 and complementary slot 120 aids in stabilizing the connection between second connecting block 114 and second driver element 116. Again, as in first cutting assembly 50, a relatively large bolt 86 fastens together two major components of second head assembly 110, specifically, second head attach bar 112 and second connecting block 114. In this exemplary embodiment, second cutting assembly 52 is similar to first cutting assembly 50 but not identical, as explained later in this written specification. In other embodiments, however, second cutting assembly 52 can be identical first cutting assembly 50.

Figure 3A:
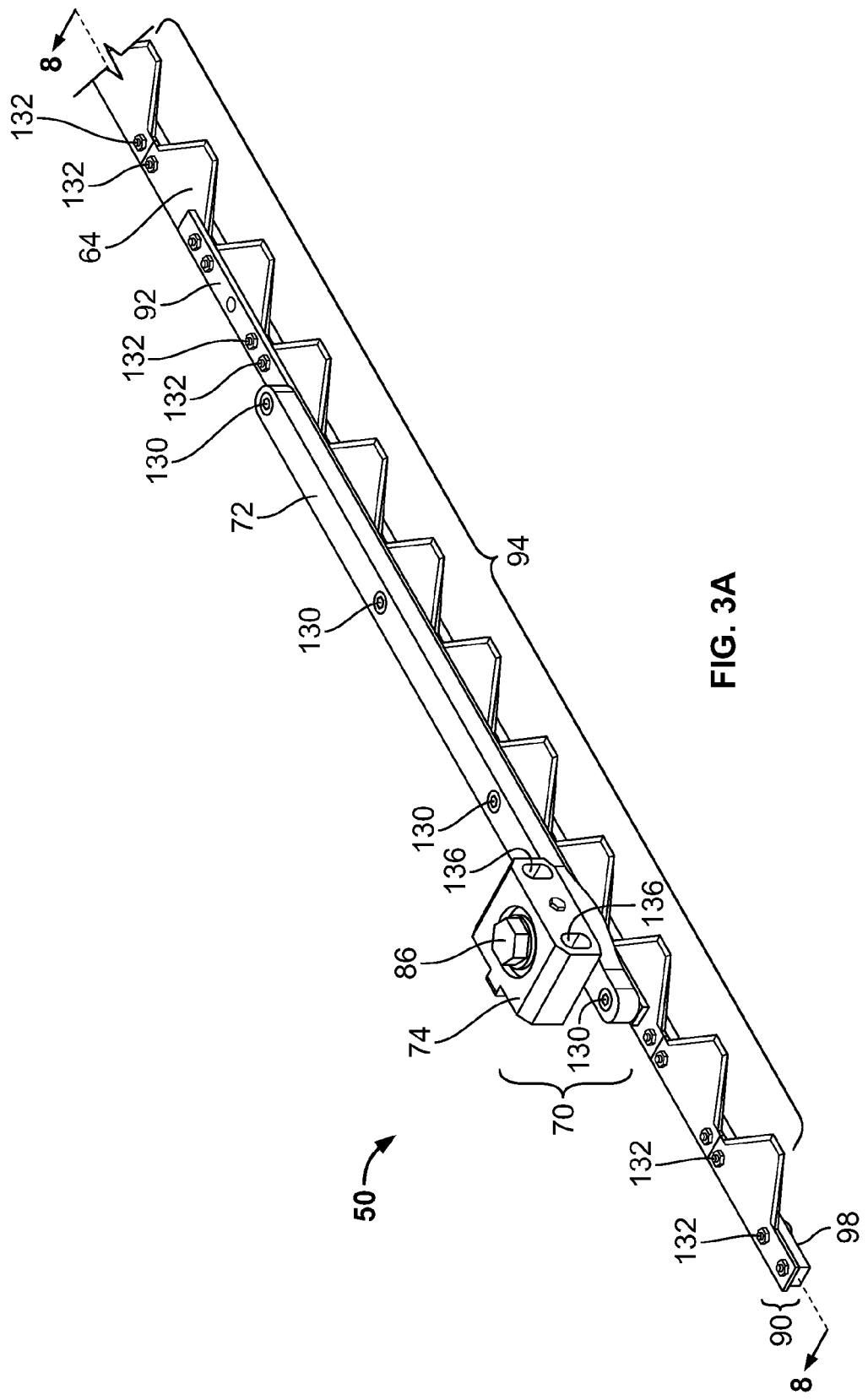
FIG. 3A is a partial front view, in perspective, of an exemplary embodiment of a cutting assembly of the present invention. The cutting assembly shown in FIG. 3A comprises a head assembly and a blade assembly.
Figure 3B:
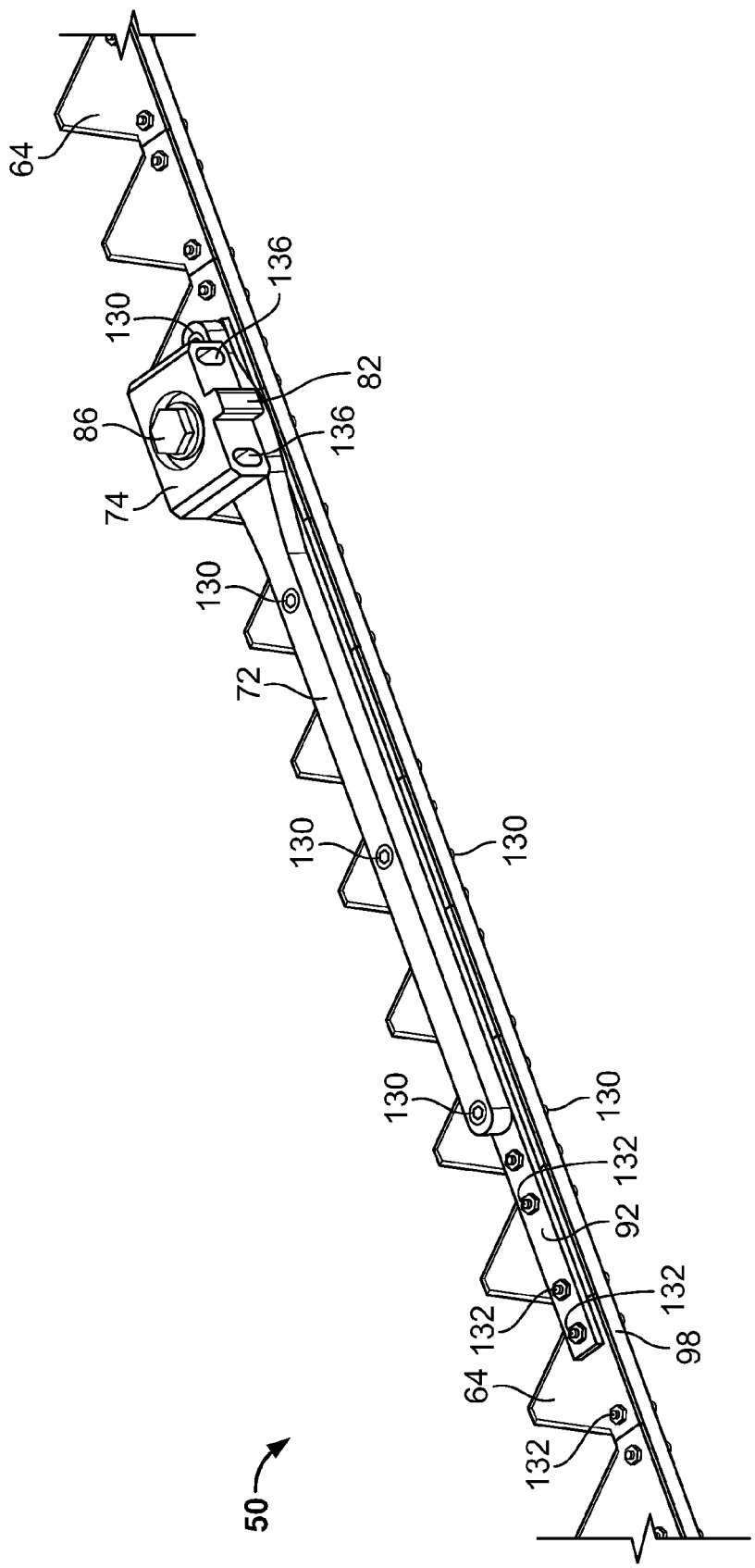
FIG. 3B is a partial rear view, in perspective, of the exemplary embodiment of the cutting assembly shown in FIG. 3A.

FIGS. 3A and 3B respectively consist of front perspective and rear perspective views of first cutting assembly 50. First head assembly 70 and first blade assembly 90 are fastened together via four fasteners 130. Each of the four fasteners 130 passes through first head attach bar 72 and penetrates first blade attach bar 92. Additional disclosure concerning this connection is included later in this specification and in FIGS. 7-8. First plurality of blades 94 is fastened to, and supported by, first blade support bar 98. In this exemplary embodiment, each of blades 94 is fastened to first blade support bar 98 by at least two fasteners 132. First connecting block 74 defines two channels 136 configured to receive therethrough bolts 78 (see FIG. 2) to allow for attachment of first head assembly 70 to first driver element 76 (see FIG. 2).

Figure 4:
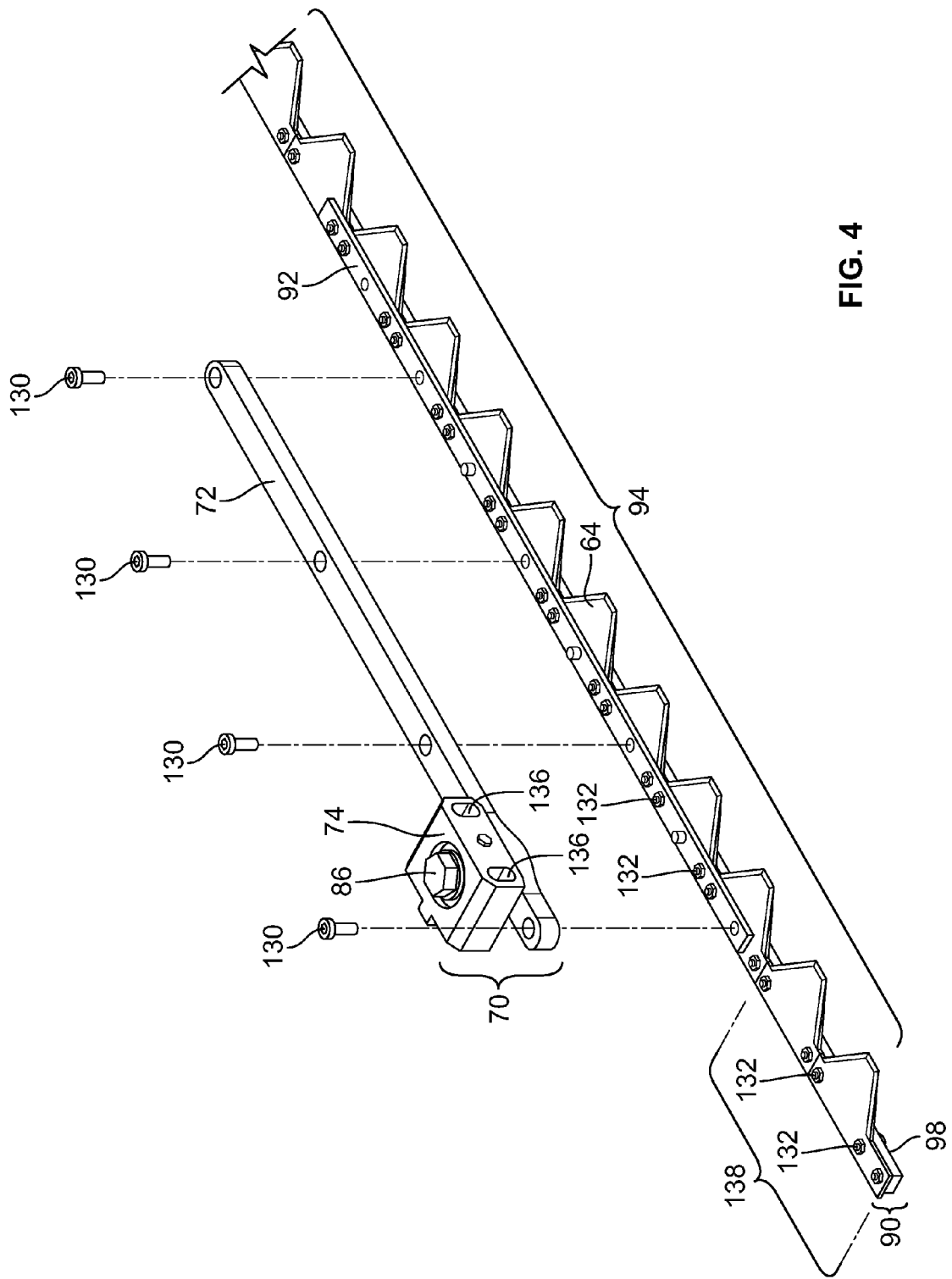
FIG. 4 is a partially exploded front view, in perspective, of the exemplary embodiment of the cutting assembly shown in FIGS. 3A and 3B.

In this exemplary embodiment, as shown in FIG. 4, removal of first blade assembly 90 from first cutting assembly 50 is efficiently effected by releasing or removing only each of the four fasteners 130, thereby releasing first blade assembly 90 from first head assembly 70. Similarly, in this exemplary embodiment, installation of first blade assembly 90 is efficiently effected by attaching first blade assembly 90 to first head assembly 70 via four fasteners 130. These features allow the operator to readily remove and/or replace first plurality of blades 94 as needed, even though first cutting assembly 50 is center-mounted. Removal and/or replacement of header blades (e.g., first plurality of blades 94) generally is required as they become damaged or worn during operation of the combine. Additionally, these features can aid the operator in maintaining or servicing the blades by facilitating their removal from the header and their subsequent re-installation. There is no rigid requirement concerning the number of fasteners 130. For example, the invention may be practiced using three fasteners 130, or some other number of fasteners 130. FIG. 4 depicts a first overlap blade portion 138, the significance of which is explained later in this written specification.

Figure 5A:
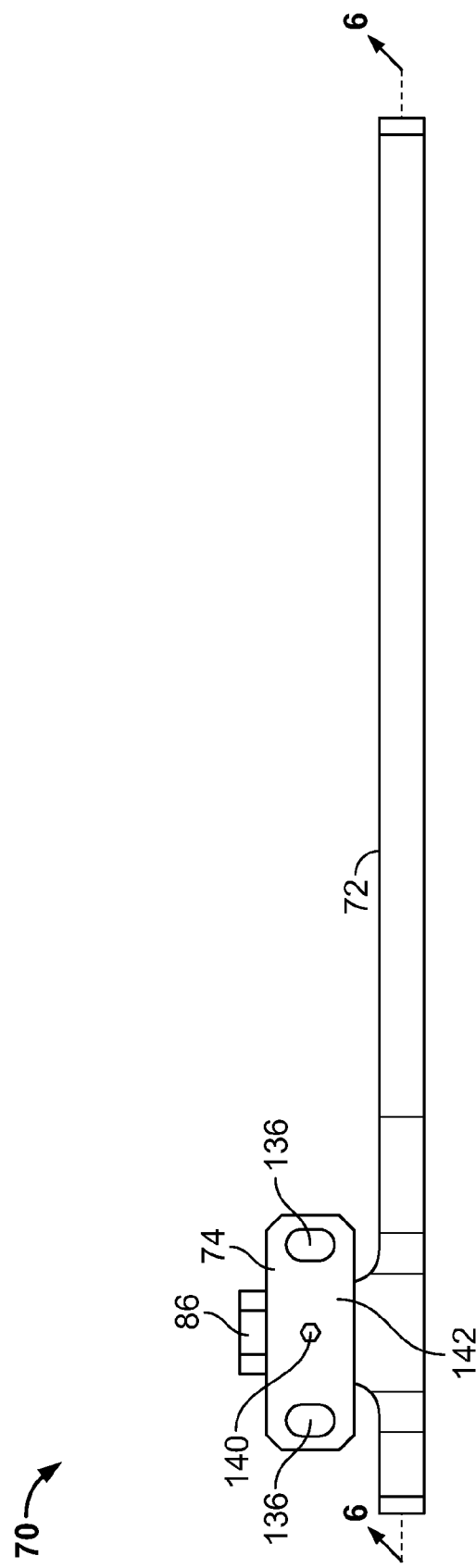
FIG. 5A is a front view of the head assembly shown in FIGS. 3A, 3B and 4.
Figure 5B:
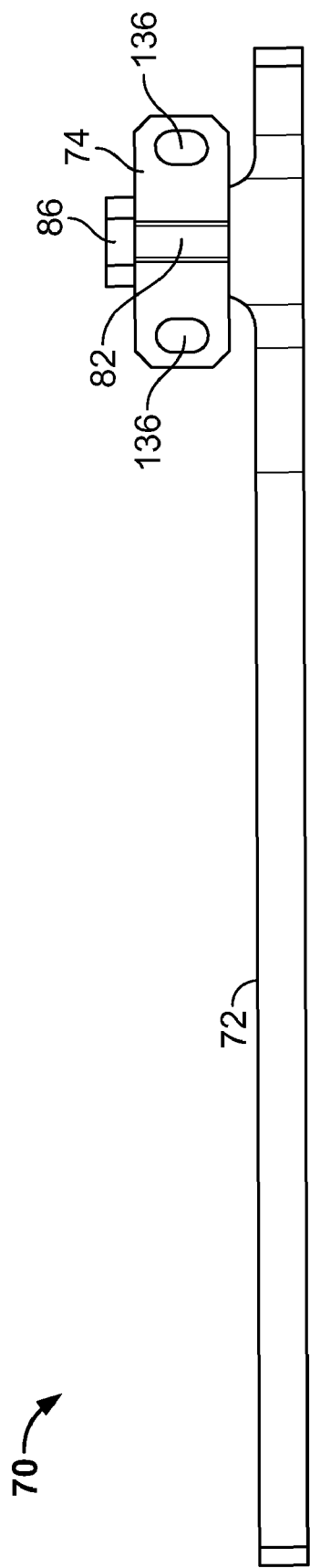
FIG. 5B is a rear view of the head assembly shown in FIGS. 3-5A.

FIGS. 5A and 5B respectively consist of front and rear views of first head assembly 70. First head attach bar 72, first connecting block 74, relatively large bolt 86, and channels 136 are shown therein. FIG. 5B shows protrusion 82, which, as stated previously, aids in stabilizing the connection between first connecting block 74 and first driver element 76 (see FIG. 2). Protrusion 82, by engaging first driver element 76, helps prevent first connecting block 74 from rotating relative to first driver element 76. Rotation can compromise the efficiency of the transfer of mechanical energy from the motor to first cutting assembly 50. Rotation can also increase vibrations in header 22 during operation of combine 20, requiring additional structural support and damping, thereby increasing manufacturing costs.

Figure 6A:
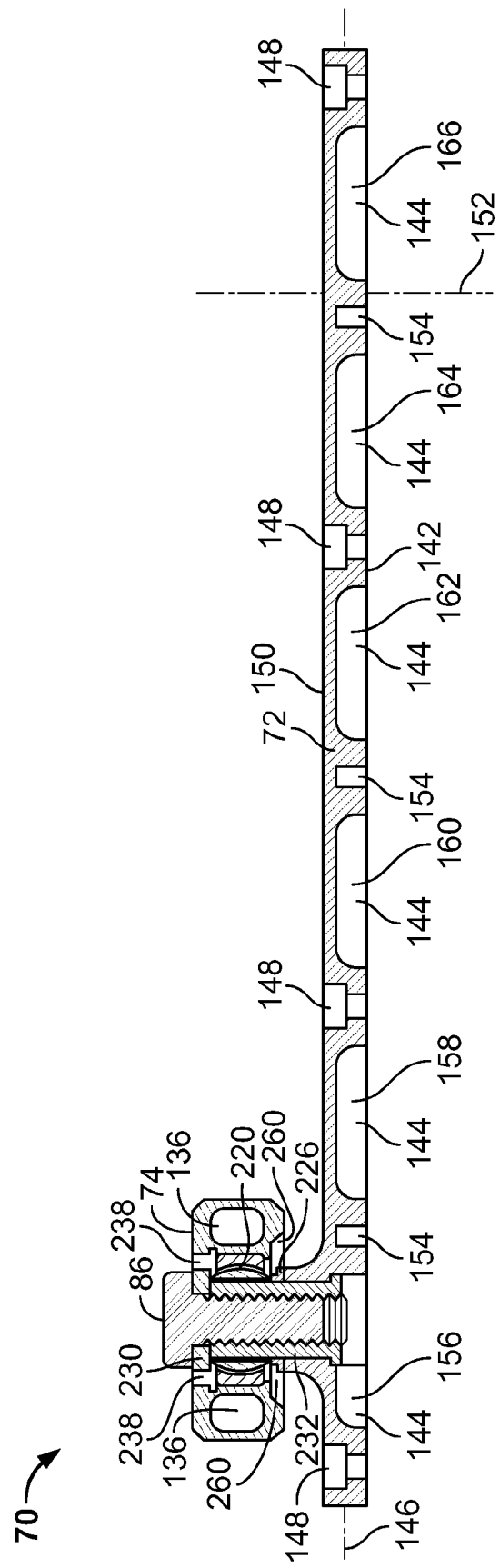
FIG. 6A is a cross-section view of the head assembly taken along line 6-6 of FIG. 5A.

FIG. 6A, which is a cross-section view of first head assembly 70 taken along line 6-6 of FIG. 5A, discloses several internal elements and features of the invention. First surface 142 of first head attach bar 72 defines a series of linearly-oriented elongate cavities 144 along, or parallel to, a major axis 146 of first head attach bar 72. The series of linearly-oriented elongate cavities 144 resembles a discontinuous groove along major axis 146 (see also FIG. 6C). First head attach bar 72 includes a series of linearly-oriented fastener-receiving through-openings 148. Each of through-openings 148 passes through both a second surface 150 and (opposing) first surface 142 of first head attach bar 72, and is configured to receive therethrough bolt 130 (see FIG. 4) for the purpose of securing first head assembly 70 to first blade assembly 90 (see FIG. 4). As depicted in the exemplary embodiment shown in FIG. 6A, through-openings 148 are interposed between some of cavities 144 and are oriented parallel to a minor axis 152, which is perpendicular to major axis 146. First surface 142 defines a series of linearly-oriented pin-receiving holes 154, which are configured to receive a series of pins 276 present on first blade attach bar 92 (see FIG. 7). Similar to each of through-openings 148, each of pin-receiving holes 154 is interposed between some of cavities 144. In the exemplary embodiment shown in FIG. 6A, no pin-receiving hole 154 is interposed between two cavities 144 having a through-opening 148 interposed therebetween. As shown in FIG. 6A, an alternating pattern is present wherein: a pin-receiving hole 154 is interposed between the first and second cavities 156, 158; a through-opening 148 is interposed between second and third cavities 158, 160; a pin-receiving hole 154 is interposed between the third and fourth cavities 160, 162; a through-opening 148 is interposed between fourth and fifth cavities 162, 164; and a pin-receiving hole 154 is interposed between the fifth and sixth cavities 164, 166. This alternating pattern does not define the scope of the invention, however, as other patterns may be substituted, including a pattern wherein a through-opening 148 and a pin-receiving hole 154 are interposed between each of cavities 144.

Figure 6B:
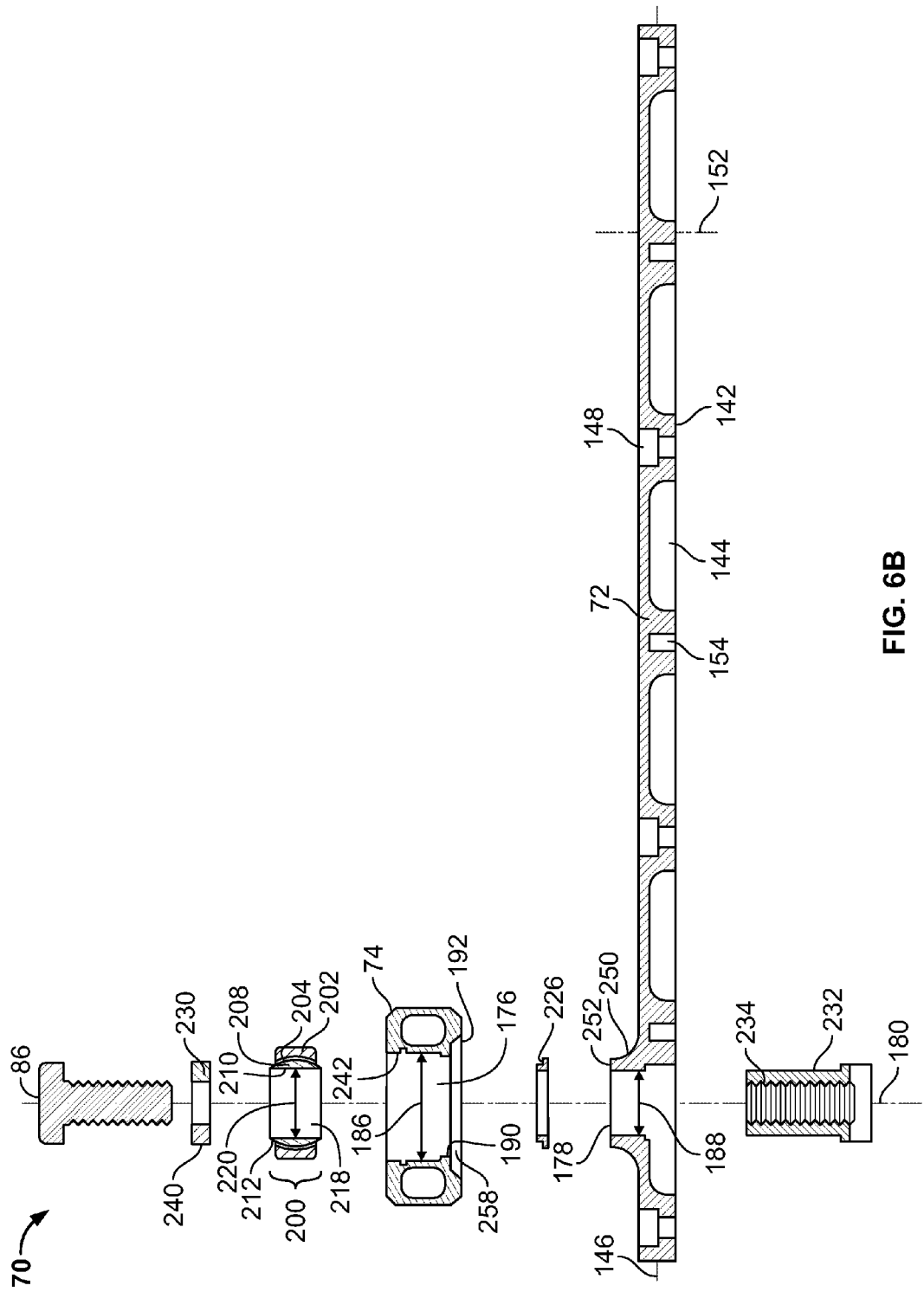
FIG. 6B is an exploded version of the cross-section view of head assembly shown in FIG. 6A.

Referring to FIG. 6A and FIG. 6B, which consists of an exploded version of the cross-section view shown in FIG. 6A, first connecting block 74 includes a connecting block through-opening 176, and first head attach bar 72 includes a head attach bar through-opening 178. The respective center axes of connecting block through-opening 176 and head attach bar through-opening 178 coincide and are represented in FIG. 6B by axis 180, which parallels minor axis 152. The diameter 186 of connecting block through-opening 176 is greater than the diameter 188 of head attach bar through-opening 178. An annular protrusion 190 proximate to a base 192 of connecting block through-opening 176 serves a seat for a bearing unit 200, which includes an annular retainer 202 having a concave interior surface 204 and an annular bearing 208 having a cylindrical interior surface 210 and a spherical exterior surface 212 that is complementary to concave interior surface 204 of annular retainer 202. Annular bearing 208 defines a bearing through-opening 218 having a diameter 220 that is approximately equal to diameter 188 of head attach bar through-opening 178. The center axis of bearing through-opening 218 coincides with center axis 180. In this exemplary embodiment, a first washer 226 mediates contact between first connecting block 74, which usually is composed of hard steel, and first head attach bar 72, which usually is composed of soft steel, thereby reducing friction that may otherwise contribute to wear of first head attach bar 72. A second washer 230 mediates contact between bolt 86 and bearing unit 200. A hollow cylindrical spacer nut 232 extends through head attach bar through-opening 178, first washer 226, and bearing through-opening 218, until meeting second washer 230. Hollow cylindrical spacer nut 232 has a threaded cylindrical interior surface 234 configured to threadingly engage bolt 86. While bolt 86 extends through second washer 230, bearing unit 200, connecting block through-opening 176, and first washer 226, penetrating head attach bar through-opening 178, contact between bolt 86 and each of these components, except second washer 230, is mediated by hollow cylindrical spacer nut 232. The engagement of bolt 86 and hollow cylindrical spacer nut 232 secures and maintains the components of first head assembly 70 in proper position and orientation.

Second washer 230 has an interior diameter and an exterior diameter that is greater than the interior diameter. The interior diameter is sufficient to allow bolt 86 to pass through second washer 230. The exterior diameter is significantly less than diameter 186 of head attach bar through-opening 178, resulting in the presence of first annular space 238 (see FIG. 6A) between an exterior cylindrical surface 240 of second washer 230 and an interior cylindrical surface 242 (see FIG. 6B) of first connecting block 74. First annular space 238, in combination with second annular space 260 (see below), allows first head attach bar 72 to partially realize the range of motion enabled by bearing unit 200.

Figure 6C:
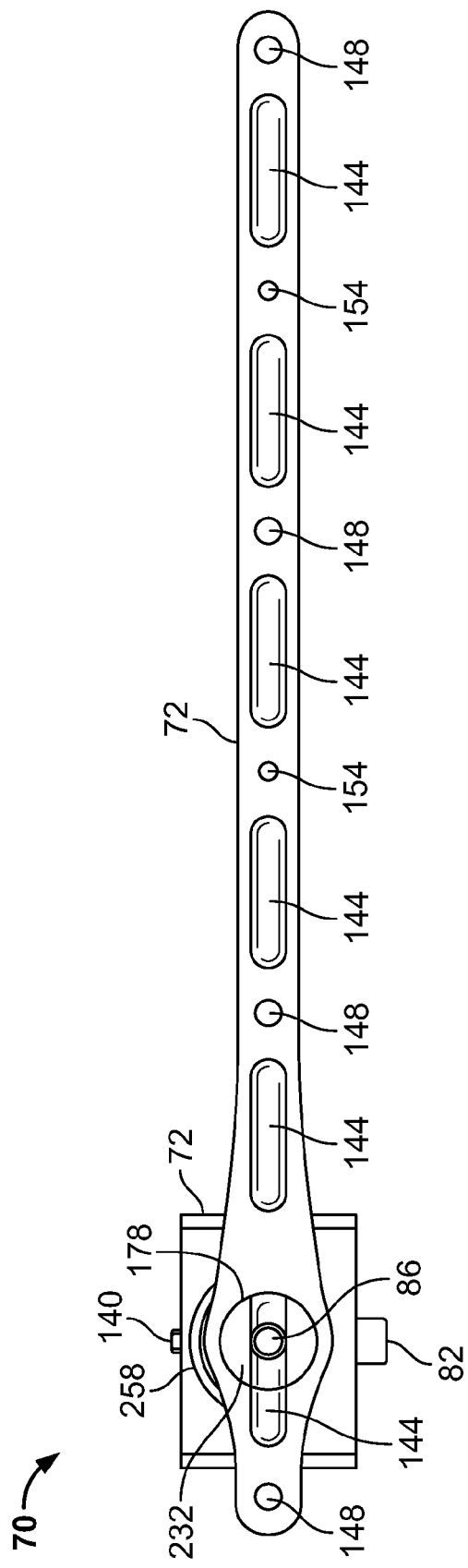
FIG. 6C is a bottom view of the head assembly shown in FIGS. 3-6B.

As shown in FIG. 6A, first connecting block 74 does not rest directly on first head attach bar 72. Rather, the area of second surface 150 (of first head attach bar 72) bordering head attach bar through-opening 176 is elevated due to the presence of a curved annular projection 250 (see FIG. 6B). First washer 226 rests on an annular surface 252 (see FIG. 6B) of curved annular projection 250, mediating contact between bearing unit 200 and first head attach bar 72. First connecting block 74 also includes a grease fitting 140 (see FIG. 5A), which passes completely through a front wall 142 (see FIG. 5A) of first connecting block 74. First connecting block 74 includes a curved annular surface 258 (see FIG. 6B) that borders connecting block through-opening 176. Second annular space 260 (see FIG. 6A), which is coaxial to first annular space 238, results more or less from the following combination of component and features: curved annular projection 250, curved annular surface 258, and first washer 226. As stated previously, first annular space 238 and second annular space 260 allow first head attach bar 72 to partially realize the range of motion enabled by bearing unit 200. The significance of the range-of-motion feature is explained later in this written specification. FIG. 6C (a bottom view of first head assembly 70) provides another view of some of the various components and features depicted in FIGS. 6A-6B, including head attach bar through-opening 178 and linearly-oriented elongate cavities 144. Additionally, the coaxial relationship among head attach bar through-opening 178, bolt 86, and hollow cylindrical spacer nut 232 is further disclosed therein.

Figure 7:
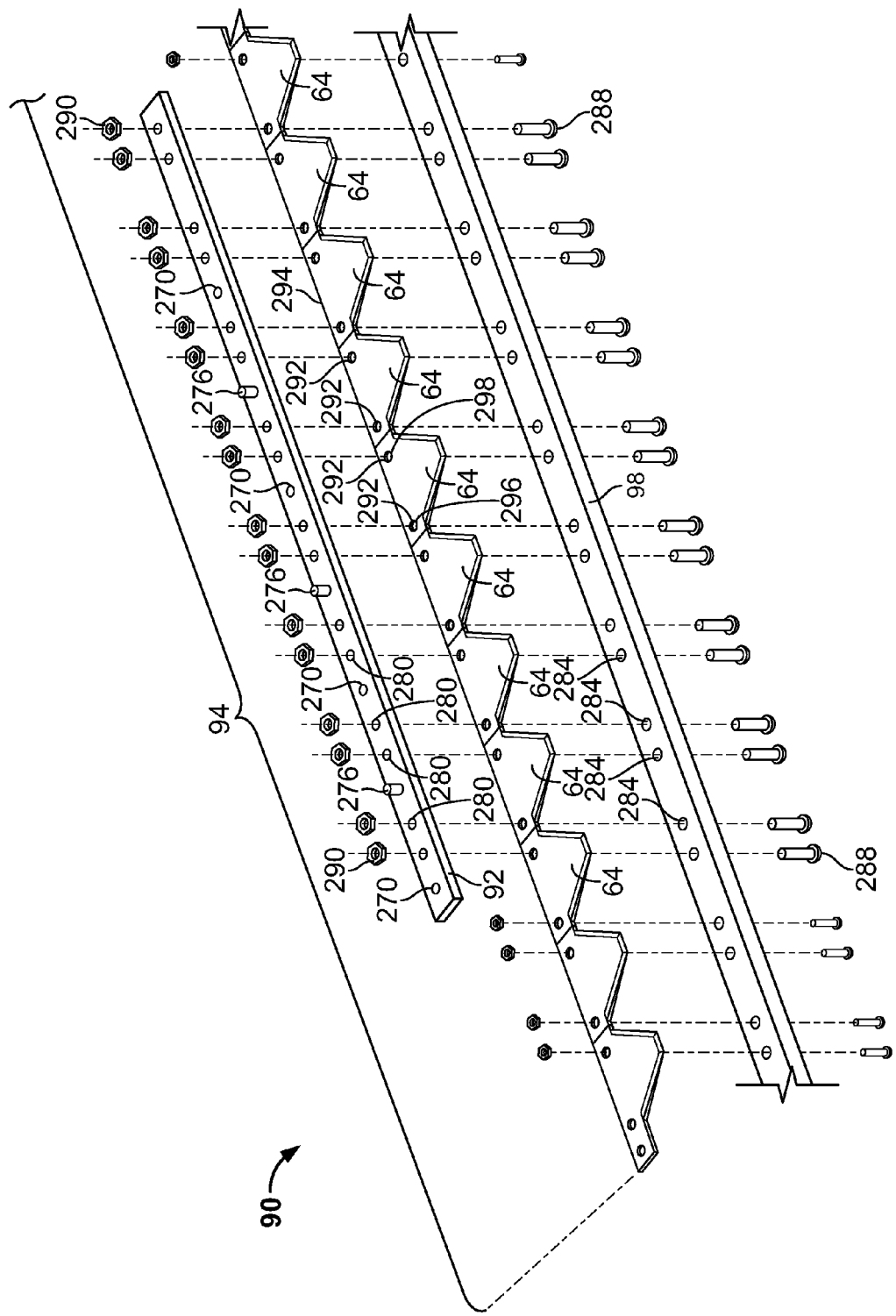
FIG. 7 is an exploded partial front view, in perspective, of the blade assembly shown in FIG. 3A.

FIG. 7 consists of an exploded front view, in perspective, of first blade assembly 90 (see FIGS. 3A and 4). First blade attach bar 92 includes a series of first apertures 270 and a series of pins 276. Series of first apertures 270 is configured to receive fasteners 130 (see FIGS. 3A, 3B, and 4). Each of fasteners 130 passes through first head attach bar 72 and penetrates first blade attach bar 92 by way of first aperture 270, securing first head attach bar 72 to first blade attach bar 92. Similarly, series of pins 276 is configured to engage first blade attach bar 92 by way of series of linearly-oriented pin-receiving holes 154 (see FIG. 6A). This engagement between series of pins 276 and series of pin-receiving holes 154 assists in transferring the mechanical load from first head assembly 70 to first blade assembly 90 during operation of header 22 of combine 20. The aforementioned mechanical load results from the motor-driven reciprocation of first head assembly 70 by first driver element 76 (see FIG. 2).

Referring still to FIG. 7, first blade attach bar 92 further includes a first series of paired apertures 280, and first blade support bar 98 includes a second series of paired apertures 284. Both first series of paired apertures 280 and second series of paired apertures 284 are respectively configured to receive a fastener 288 (e.g., a bolt) therethrough. Still referring to FIG. 7, each blade 64 of first plurality of blades 94 includes a set of linearly-oriented blade apertures 292. Each set of linearly-oriented blade apertures 292 parallels, and is proximate to, a trailing edge 294 of blade 64. In the exemplary embodiment shown in FIG. 7, each set consists of a first distal blade aperture 296 and a second distal blade aperture 298. First series of paired apertures 280 (of first blade attach bar 92), second series of paired apertures 284 (of first blade support bar 98), and set of blade apertures 292 are coaxial, thus allowing fasteners 288 and corresponding nuts 290 to firmly secure blades 64 between first blade attach bar 92 and first blade support bar 98.

Figure 8:
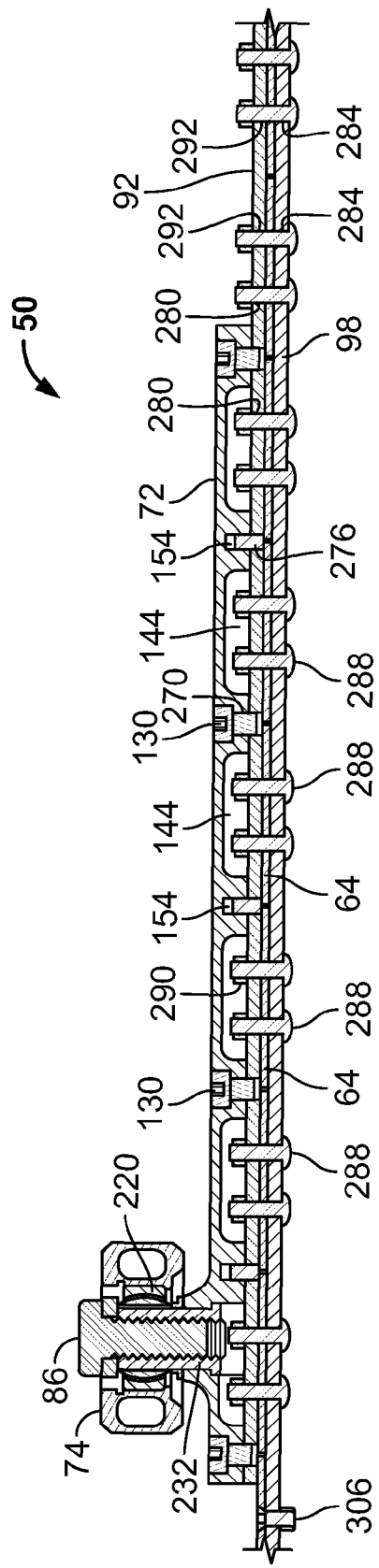
FIG. 8 is a front cross-section view of first cutting assembly taken along line 8-8 of FIG. 3A.

FIG. 8, which consists of a front cross-section view of first cutting assembly 50 taken along line 8-8 of FIG. 3A, further elucidates the relationship among some of the various components and features of first cutting assembly 50. As suggested by FIG. 8, the purpose of series of linearly-oriented elongate cavities 144 is to allow first head attach bar 72 to accommodate the profile of fasteners 288 and corresponding nuts 290 and, therefore, maintain flush contact of surface 142 with first blade attach bar 92. A lower-profile fastener 306, such as a countersunk fastener head, is used to secure blades 64 to first blade support bar 98 in those blade sections extending beyond first blade attach bar 92.

Figure 9:
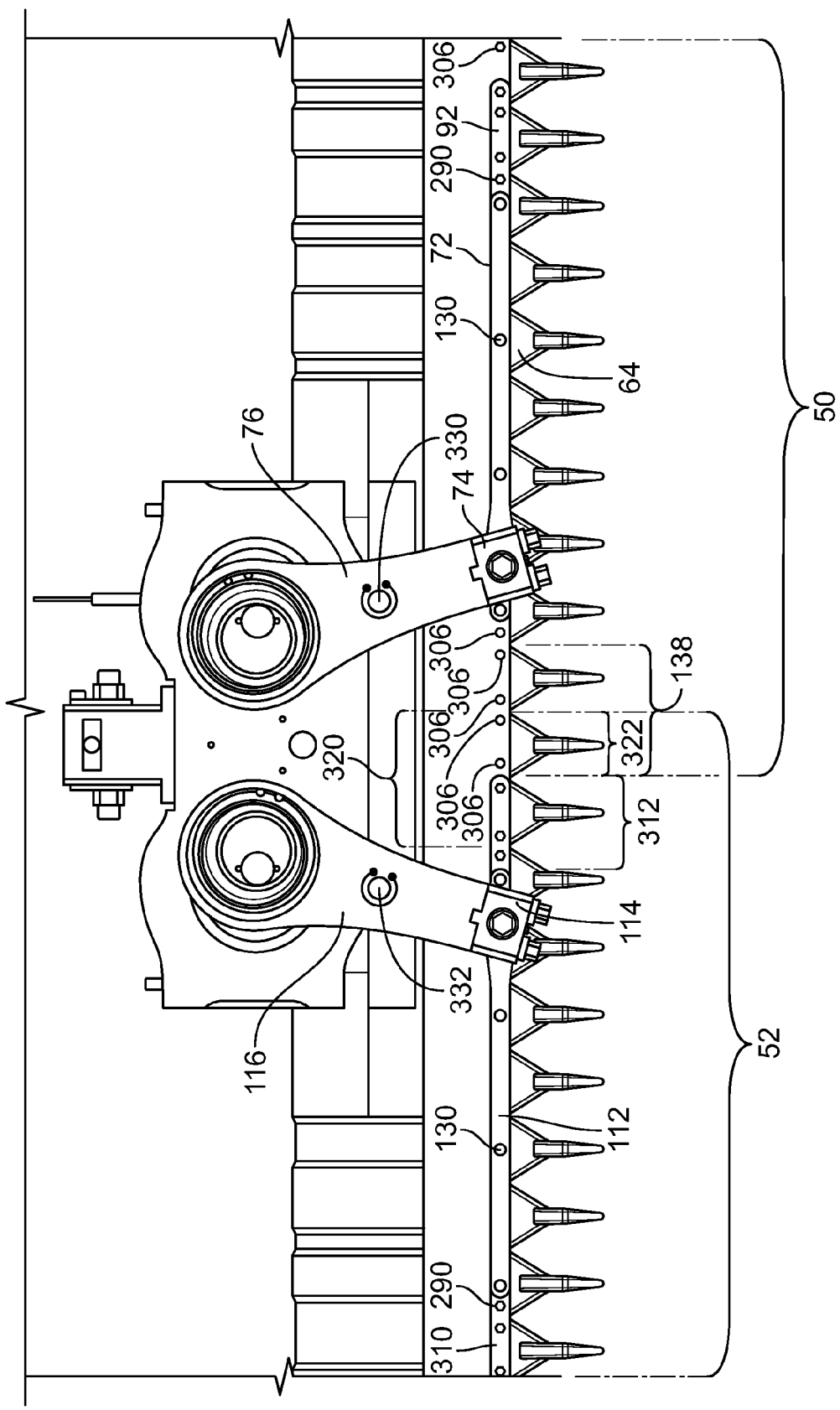
FIG. 9 is a partial top view of a header showing exemplary embodiments of both first and second cutting assemblies.

In the exemplary embodiment shown in FIG. 9, second cutting assembly 52, although oriented differently, is nearly identical to first cutting assembly 50, the only significant difference being that a second head attach bar 310 optionally includes an extended portion 312, unlike first head attach bar 92, which does not include an analogous feature. It is worth noting that second cutting assembly 52 includes a second overlap blade portion 320 that is analogous to first overlap blade portion 138 of first cutting assembly 50 (see FIG. 4). First driver element 76 and second driver element 116 are shown in their "open" position, in contrast to FIG. 2, in which they are shown in their "closed" position. In the open position, one blade of first overlap blade portion 138 overlaps one blade of second overlap blade portion 320. This region of overlap is identified in FIG. 9 by reference number 322. In the closed position (see FIG. 2), both blades of first overlap blade portion 138 overlap both blades of second overlap blade portion 320. Still referring to FIG. 2, if first head attach bar 92 were to also include an extended portion identical to extended portion 312 of second head attach bar 310, these two extended portions would collide as first driver element 76 and second driver element 116 assumed the closed position, thereby disrupting operation. Nevertheless, extended portion 312, which is an optional feature, can be included on second cutting assembly 52 to enhance stability.

FIG. 9 also underscores the significance of bearing unit 200 and the related components effecting the range-of-motion feature of the invention discussed previously. During operation, first driver element 76 and second driver element 116 respectively pivot about first pivot point 330 and second pivot point 332. This non-linear (pivoting) reciprocation of first driver element 76 and second driver element 116 encourages non-linear reciprocation of first cutting assembly 50 and second cutting assembly 52. The degrees of freedom enabled by bearing unit 200 aids in damping the non-linear tendencies of this reciprocation. The incorporation of bearing unit 200 within each of the head assemblies (see, e.g., first head assembly 70), both of which lie above the plane defined by the reciprocating blades, helps ensure that functioning of header 22 is not significantly compromised by center-mounting first and second cutting assemblies 50, 52.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A knife head assembly for a header of an agricultural cutting machine, the knife head assembly comprising:
    an elongate head attach bar having a major axis, the elongate head attach bar comprising:
    a first surface being configured to form a flush contact with a blade assembly;
    a series of first fastener-receiving through-openings, each first fastener-receiving through-opening of the series passing through the first surface and a second surface, the series of first fastener-receiving through-openings being substantially perpendicular to the major axis; and
    a projection extending from the second surface and disposed on a distal end thereof the projection having a second fastener-receiving through-opening passing through the first and second surfaces; and
    a connecting block disposed about the projection such that the connecting block is elevated above the second surface, the connecting block being configured to receive a driver element, the connector block includes a connecting block through-opening, the connecting block being configured to retain a bearing unit in the connecting block through-opening, the bearing unit having a bearing through-opening, wherein the respective center axes of the second fastener-receiving through-opening, the connector block through-opening and the bearing unit through-opening are substantially coaxial along a minor axis, wherein the minor axis is substantially perpendicular to the major axis.

2. The knife head assembly of claim 1, wherein the series of cavities is substantially parallel to the major axis of the elongate head attach bar.

3. The knife head assembly of claim 1, further comprising a fastener configured to secure the bearing unit and the elongate head attach bar, a portion of the fastener penetrating the bearing through-opening and the second fastener-receiving through-opening.

4. The knife head assembly of claim 3, wherein the fastener comprises a fastener and a spacer nut, the spacer nut having a threaded cylindrical interior surface.

5. The knife head assembly of claim 1, wherein the second fastener-receiving through-opening is proximate to an end of the elongate head attach bar.

6. The knife head assembly of claim 1, wherein the elongate head attach bar further comprises a series of pin-receiving openings along the first surface.

7. The knife assembly of claim 1, wherein the connector block has a tab and the driver element has a complimentary slot configured to receive the tab to stabilize the connection between the connector block and the driver element.

8. A cutting assembly suitable for mounting proximate to the center of a header of a plant-cutting machine, the cutting assembly comprising:
    a head assembly comprising:
    an elongate head attach bar having a major axis, the elongate head attach bar comprising:
    a first surface being configured to form a flush contact with a blade assembly;
    a series of first fastener-receiving through-openings, each first fastener-receiving through-opening of the series passing through the first surface and a second surface, the series of first fastener-receiving through-openings being substantially perpendicular to the major axis and being configured to receive a series of removable fasteners therethrough; and
    a projection extending from the second surface and disposed on a distal end thereof, the projection having second fastener-receiving through opening passing through the first and second surfaces;
    and
    a connecting block disposed about the projection such that the connecting block is elevated above the second surface, the connecting block being configured to receive a driver element, the connector block includes a connecting block through-opening, the connecting block being configured to retain a bearing unit in the connecting block through-opening, the bearing through-opening, wherein the respective center axes of the second fastener-receiving through-opening, the connector block through-opening and the bearing unit through-opening are substantially coaxial along a minor axis, wherein the minor axis is substantially perpendicular to the major axis.

9. The cutting assembly of claim 8, wherein the blade assembly further comprises:
    an elongate blade support bar comprising a series of blade support bar through-openings, each blade support bar through-opening of the series being configured to receive a blade fastener therethrough, the series of blade support bar through-openings being substantially coaxial to the series of second apertures of the elongate blade attach bar and being substantially aligned with the series of cavities of the elongate head attach bar.

10. The cutting assembly of claim 9, wherein the blade assembly further comprises:
    a series of blades, each blade of the series comprising a trailing edge and a set of blade apertures proximate to the trailing edge.

11. The cutting assembly of claim 10, wherein the blade assembly further comprises:
    a series of blade fasteners passing through the series of blade support bar through-openings, the sets of blade apertures, and the series of blade support bar through-openings, thereby securing the series of blades between the elongate blade support bar and the elongate blade attach bar.

12. The cutting assembly of claim 8, wherein the series of cavities is substantially parallel to the major axis of the elongate head attach bar.

13. The cutting assembly of claim 8, wherein the elongate head attach bar further comprises a series of pin-receiving holes along the first surface.

14. The cutting assembly of claim 13, wherein the elongate blade attach bar further comprises a series of pins along a second surface, the series of pins engaging the series of pin-receiving holes of the elongate head attach bar.

15. The cutting assembly of claim 8, further comprising a head assembly fastener configured to secure bearing unit and elongate head attach bar, a portion of the head assembly fastener penetrating the bearing through-opening and the second fastener-receiving through-opening.

16. The cutting assembly of claim 15, wherein the fastener comprises a bolt and a spacer nut, the spacer nut having a threaded cylindrical interior surface.

17. The cutting assembly of claim 8, wherein the second fastener-receiving through-opening is proximate to an end of the elongate head attach bar.

18. The cutting assembly of claim 8, wherein the length of elongate blade attach bar is greater than the length of elongate head attach bar.

19. A header for a plant-cutting machine comprising:
a first cutting assembly drivingly connected proximate the center of the header;
a second cutting assembly drivingly connected proximate the center of the header, the second cutting assembly being in an end-to-end relation with the first cutting assembly and being substantially coaxial to the first cutting assembly, the second cutting assembly comprising:
a head assembly comprising:
an elongate head attach bar having a major axis, the elongate head attach bar comprising:
a first surface being configured to form a flush contact with a blade assembly;
a series of first fastener-receiving through-openings, each first fastener-receiving through-opening of the series passing through the first surface and a second surface, the series of first fastener-receiving through-openings being substantially perpendicular to the major axis and being configured to receive a series of removable fasteners therethrough; and
a projection extending from the second surface and disposed on a distal end thereof, the projection having a second fastener-receiving through-opening passing through the first and second surfaces;
and
a connecting block disposed about the projection such that the connecting block is elevated above the second surface, the connecting block being configured to receive a driver element, the connector block includes a connecting block through-opening, the connecting block being configured to retain a bearing unit in the connecting block through-opening, the bearing unit having a h-opening, wherein the respective center axes of the second fastener-receiving through-opening, the connector block through-opening and the bearing unit through-opening are substantially coaxial along a minor axis, wherein the minor axis is substantially perpendicular to the major axis.

20. The header of claim 19, wherein the second center-mounted cutting assembly further comprises:
a blade assembly comprising:
an elongate blade attach bar comprising:
a series of first apertures configured to receive a series of removable fasteners, the series of first apertures being substantially coaxial with the series of first fastener-receiving through-openings of the elongate head attach bar; and
a series of second apertures configured to receive a series of blade fasteners therethrough; the series of second apertures being substantially aligned with the series of cavities of the elongate head attach bar; and
a series of removable fasteners securing the elongate blade attach bar to the elongate head attach bar, thereby securing the blade assembly to the head assembly, the series of removable fasteners passing through the series of first fastener-receiving through-openings of the elongate head attach bar and penetrating the series of first apertures of the elongate blade attach bar.

21. The header of claim 20, wherein the blade assembly further comprises:
a series of blades, each blade of the series comprising a trailing edge and a set of blade apertures proximate to the trailing edge; and
a series of blade fasteners passing through the series of blade support bar through-openings, the sets of blade apertures, and the series of blade support bar through-openings, thereby securing the series of blades between the elongate blade support bar and the elongate blade attach bar.

* * * * *